(12) United States Patent
Yuliang et al.

(10) Patent No.: US 7,780,181 B2
(45) Date of Patent: Aug. 24, 2010

(54) REAR PORTION STRUCTURE OF A VEHICLE BODY FOR A SADDLE-TYPE VEHICLE

(75) Inventors: Cheng Yuliang, Saitama (JP); Rinatsu Iida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 8 days.

(21) Appl. No.: 12/378,070

(22) Filed: Feb. 11, 2009

(65) Prior Publication Data

US 2009/0230654 A1 Sep. 17, 2009

(30) Foreign Application Priority Data

Mar. 11, 2008 (JP) .............................. 2008-060914

(51) Int. Cl.
*B62K 11/02* (2006.01)
(52) U.S. Cl. .................... 280/281.1; 280/274; 280/291; 280/294
(58) Field of Classification Search ............. 280/281.1, 280/274, 291, 294, 298; 180/219
See application file for complete search history.

(56) References Cited

U.S. PATENT DOCUMENTS

| 4,666,175 | A | * | 5/1987 | Mueller | 280/291 |
| 4,673,052 | A | * | 6/1987 | Shinozake et al. | 180/219 |
| 6,582,001 | B2 | * | 6/2003 | Yagisawa et al. | 296/37.1 |
| 7,360,620 | B2 | * | 4/2008 | Takenaka et al. | 180/291 |
| 7,497,455 | B2 | * | 3/2009 | Kamalian | 280/281.1 |
| 7,543,673 | B2 | * | 6/2009 | Lachapelle et al. | 180/210 |
| 2003/0151227 | A1 | * | 8/2003 | Tokumura et al. | 280/291 |
| 2004/0206564 | A1 | * | 10/2004 | Nagashii et al. | 180/219 |
| 2006/0283647 | A1 | * | 12/2006 | Seki et al. | 180/219 |
| 2007/0075521 | A1 | * | 4/2007 | Ogasawara et al. | 280/291 |
| 2008/0202835 | A1 | * | 8/2008 | Suita et al. | 180/219 |
| 2009/0008900 | A1 | * | 1/2009 | Ishikawa et al. | 280/291 |
| 2009/0107751 | A1 | * | 4/2009 | Kobayashi et al. | 180/219 |
| 2009/0166119 | A1 | * | 7/2009 | Susaki | 180/219 |
| 2009/0242304 | A1 | * | 10/2009 | Tahara et al. | 180/219 |

FOREIGN PATENT DOCUMENTS

| JP | 2006-232166 | 9/2006 |
| JP | 2007-055489 | 3/2007 |
| JP | 2007-237898 | 9/2007 |

* cited by examiner

*Primary Examiner*—Lesley Morris
*Assistant Examiner*—Tashiana Adams
(74) *Attorney, Agent, or Firm*—Carrier, Blackman & Associates, P.C.; William D. Blackman; Joseph P. Carrier

(57) ABSTRACT

A rear portion structure of a vehicle body for a saddle-type vehicle includes a pair of left and right rear frames provided rearwardly of a main frame section of the vehicle body, and pillion steps attached to the left and right rear frames through respective stays, wherein each of the rear frames includes a stay attaching portion which projects on an inner side of the frame, and to which a corresponding one of said stays is fastened in a direction substantially perpendicular to the vehicle body's leftward and rightward direction. Such rear portion structure suppresses adverse influences on rear frame rigidity and the appearance of the vehicle body when the pillion steps are attached thereto.

18 Claims, 7 Drawing Sheets

US 7,780,181 B2

REAR PORTION STRUCTURE OF A VEHICLE BODY FOR A SADDLE-TYPE VEHICLE

CROSS-REFERENCE TO RELATED APPLICATIONS

The present application claims priority under 35 USC §119 based on Japanese patent application No. 2008-060914, filed on Mar. 11, 2008. The entire subject matter of this priority document, including specification, claims and drawings, is incorporated by reference herein.

BACKGROUND OF THE INVENTION

1. Field of the Invention

The present invention relates to a rear portion structure of a vehicle body for a saddle-type vehicle including pillions that support the feet of a passenger on the vehicle.

2. Description of the Background Art

In recent years, there have been available rear portion structures of a vehicle body for a saddle-type vehicle which include: a rear frame provided rearwardly of a main frame section of a vehicle body for supporting a driver's seat and so forth, and wherein a foldable/retractable pillion step for a passenger on a rear portion of the vehicle body is attached to the rear frame, a rear portion structure of a vehicle body wherein a stay for supporting the pillion step is fastened to the rear frame in a direction extending leftward and rightward (for example, refer to Patent Document 1 or 2) and another rear portion structure of a vehicle body wherein the stay is fastened substantially in an upward and downward direction on the rear frame (for example, refer to Patent Document 3).

[Patent Document 1]—Japanese Patent Laid-Open No. 2007-55489

[Patent Document 2]—Japanese Patent Laid-Open No. 2007-237898

[Patent Document 3]—Japanese Patent Laid-Open No. 2006-232166

Incidentally, the technique disclosed in the Patent Document 1 or 2 is disadvantageous in that, since a hole for fastening a stay or the like is formed on the rear frame itself, this is likely to have an influence on the rigidity of the rear frame. Further, since a fastening bolt is exposed to the outside of the vehicle body, it is likely to degrade the appearance of the rear portion of the vehicle body.

Meanwhile, the technique disclosed in the Patent Document 3 discloses an application involving a single rear frame of a box type which is open upwardly, and indeed the rear frame rigidity is improved. However, such a configuration cannot be applied to a popular type of vehicle body rear portion which includes a pair (left and right) of rear frames. Also, such a configuration is poor in universal use.

In view of the foregoing, there is a desire for an attaching structure for a pillion step e.g., the above-mentioned stay, which can also be applied to a popular vehicle body rear portion including a pair (left and right) of rear frames and which takes rear frame rigidity into consideration.

SUMMARY OF THE INVENTION

Therefore, it is an object of the present invention to provide a rear portion structure of a vehicle body for a saddle-type vehicle which includes a pair of left and right rear frames provided rearwardly of a main frame section of the vehicle body, and which suppresses any adverse influence on rear frame rigidity and suppresses any adverse influence on the appearance of the vehicle body rear portion structure when pillion steps are attached to the left and right rear frames.

In order to achieve the above-mentioned object, according to a first aspect and feature of the present invention, there is provided a rear portion structure of a vehicle body for a saddle-type vehicle (e.g., a motorcycle 1 in an exemplary embodiment disclosed below) which comprises a pair of left and right rear frames (e.g., rear frames 15 in the exemplary embodiment) provided rearwardly of a main frame section (e.g., a main frame section 10 in the exemplary embodiment) of the vehicle body, and pillion steps (e.g., pillion steps 18 in the exemplary embodiment) attached to the left and right rear frames through respective stays (e.g., stays 19 in the exemplary embodiment), wherein each of said rear frames includes a stay attaching portion (e.g., stay attaching portion 36 in the exemplary embodiment) which projects on an inner side of the frame, and to which a corresponding one of said stays is fastened in a direction substantially perpendicular to the vehicle body's leftward and rightward direction.

According to a second aspect and feature of the present invention, in addition to the first aspect and feature, the rear portion structure of a vehicle body for a saddle-type vehicle further includes a cross member (e.g., a cross member 35 in the exemplary embodiment) extending between the rear frames, and the cross member is commonly fastened at left and right side portions thereof to the stay-attaching portions of the rear frames together with the stays.

According to a third aspect and feature of the present invention, in addition to either of the first and second aspects and features, the stay-attaching portions and the stays include abutting faces (e.g., abutting faces 41 to 44 in the exemplary embodiment) which extend perpendicularly to the fastening directions of the stay-attaching portions and the stays and line in substantially flush with lower faces of the rear frames.

According to a fourth aspect and feature of the present invention, in addition to the first or second aspects and features, the stay-attaching portions and the stays include abutting faces (e.g., 52 and 54 in the exemplary embodiment) which extend perpendicularly to the fastening directions of the stay-attaching portions and the stays and are displaced upwardly from lower faces of the rear frames, and stepped faces (e.g., 52a and 54a in the exemplary embodiment) which extend in parallel to the fastening directions of the stay attaching portions and are engagable with each other.

According to the first aspect and feature of the invention, application of the rear portion structure to a general vehicle body rear portion which includes a pair of left and right rear frames, is made possible, and the stays of the pillion steps are fastened to the left and right inner sides of the left and right rear frames in a direction substantially perpendicular to the vehicle body's leftward and rightward direction. Therefore, good rigidity of the rear frames can be assured in comparison with an alternative construction wherein a stay fastening hole is merely formed in a rear frame itself. Also, exposure of fastening bolts and so forth to the leftwardly and rightwardly outer sides of the vehicle body is eliminated and a good appearance of the vehicle body rear portion can be maintained.

According to the second aspect and feature of the invention, since the stays and the cross member are commonly fastened and fixed, it is possible to eliminate a fastening structure including a mounting portion, fastening bolt and so forth, in comparison to a conventional arrangement where the components are separately fastened and fixed, so that simplification of the surroundings of the rear frames and reduction of the number of parts can be achieved. Further, by connecting the left and right stay-attaching portions directly to each other by the cross member, good rigidity of the rear frames around the cross member can be assured. As a result, good rigidity of the surroundings of the rear frames to which the stays are attached can also be assured.

According to the third aspect and feature of the invention, assembly and manipulation of the stay-attaching portions and the abutting faces of the stays is facilitated, whereas projection of the stay-attaching portions from the lower face of the rear frames can be suppressed to reduce the size of the rear frames themselves.

According to the fourth aspect and feature of the invention, projection of the stay-attaching portions from the lower face of the rear frames is suppressed to reduce the size of the rear frames themselves. Further, since the stepped faces are abutted with each other, positioning of the pillion steps upon assembly is facilitated and the rigidity of the coupling portions of the rear frames after the stays are fastened can be increased.

For a more complete understanding of the present invention, the reader is referred to the following detailed description of an exemplary embodiment, which should be read in conjunction with the accompanying drawings. Throughout the following detailed description and in the drawings, like numbers refer to like parts.

BRIEF DESCRIPTION OF THE DRAWINGS

FIG. 6(*b*) is a sectional view taken along line B of FIG. 6(*a*).

DETAILED DESCRIPTION OF ILLUSTRATIVE EMBODIMENTS

Figure 1:
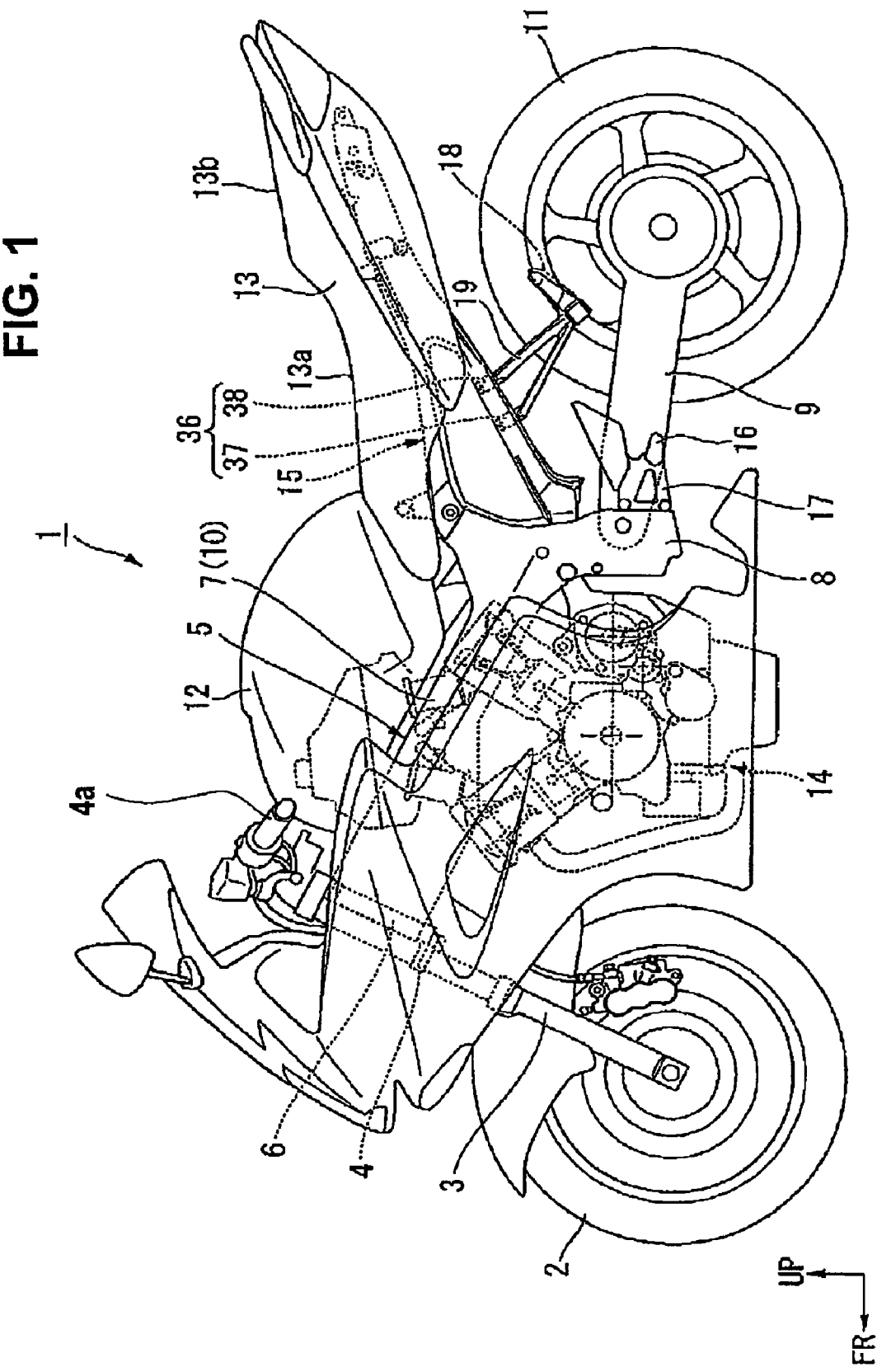
FIG. 1 is a left side elevational view of a saddle-type vehicle (motorcycle) according to an exemplary embodiment of the present invention.

It should be understood that only structures considered necessary for illustrating selected embodiments of the present invention are described herein. Other conventional structures, and those of ancillary and auxiliary components of the system, will be known and understood by those skilled in the art.

Referring now to the drawings, non-limiting, exemplary embodiments of the present invention are described in detail, so that the invention may be clearly understood. Such description is not meant to limit or prejudice the scope of the invention which is defined in the appended claims. It is to be noted that, unless otherwise specified, the directions such as forward and backward directions and leftward and rightward directions in the following description are same as those in regard to a vehicle. Further, in the figures, an arrow mark FR denotes a forward direction of the vehicle, another arrow mark LH denotes a leftward direction of the vehicle body, and a further arrow mark UP denotes an upward direction of the vehicle body.

As shown in FIG. 1, left and right front forks 3 for supporting a front wheel 2 of a motorcycle (saddle-type vehicle) 1 for rotation thereon are pivotally supported at an upper portion thereof for steering operation on a head pipe 6 at a front end portion of a vehicle body frame 5 through a steering stem 4. A steering bar handle 4*a* is attached to the steering stem 4 (or the front forks 3). Left and right main frames 7 extend rearwardly from the head pipe 6 and are connected to left and right pivot plates 8, respectively. Swing arms 9 are supported at a front end portion thereof for upward and downward rocking motion on the left and right pivot plates 8. A rear wheel 11 is supported for rotation at a rear end portion of the swing arms 9. In the following description, a section which is composed principally of the head pipe 6, left and right main frames 7 and the left and right pivot plates 8 of the vehicle body frame 5 is referred to as main frame section 10.

A fuel tank 12 is disposed above the main frame section 10, and a seat 13 for a driver is disposed rearwardly of the fuel tank 12. For example, a V-type four-cylinder engine (internal combustion engine) 14 which is a prime mover of the motorcycle 1 is installed on the inner side of the main frame section 10. A pair (left and right) of rear frames 15 for supporting the seat 13 are provided rearwardly of the main frame section 10 of the vehicle body frame 5.

Figure 2:
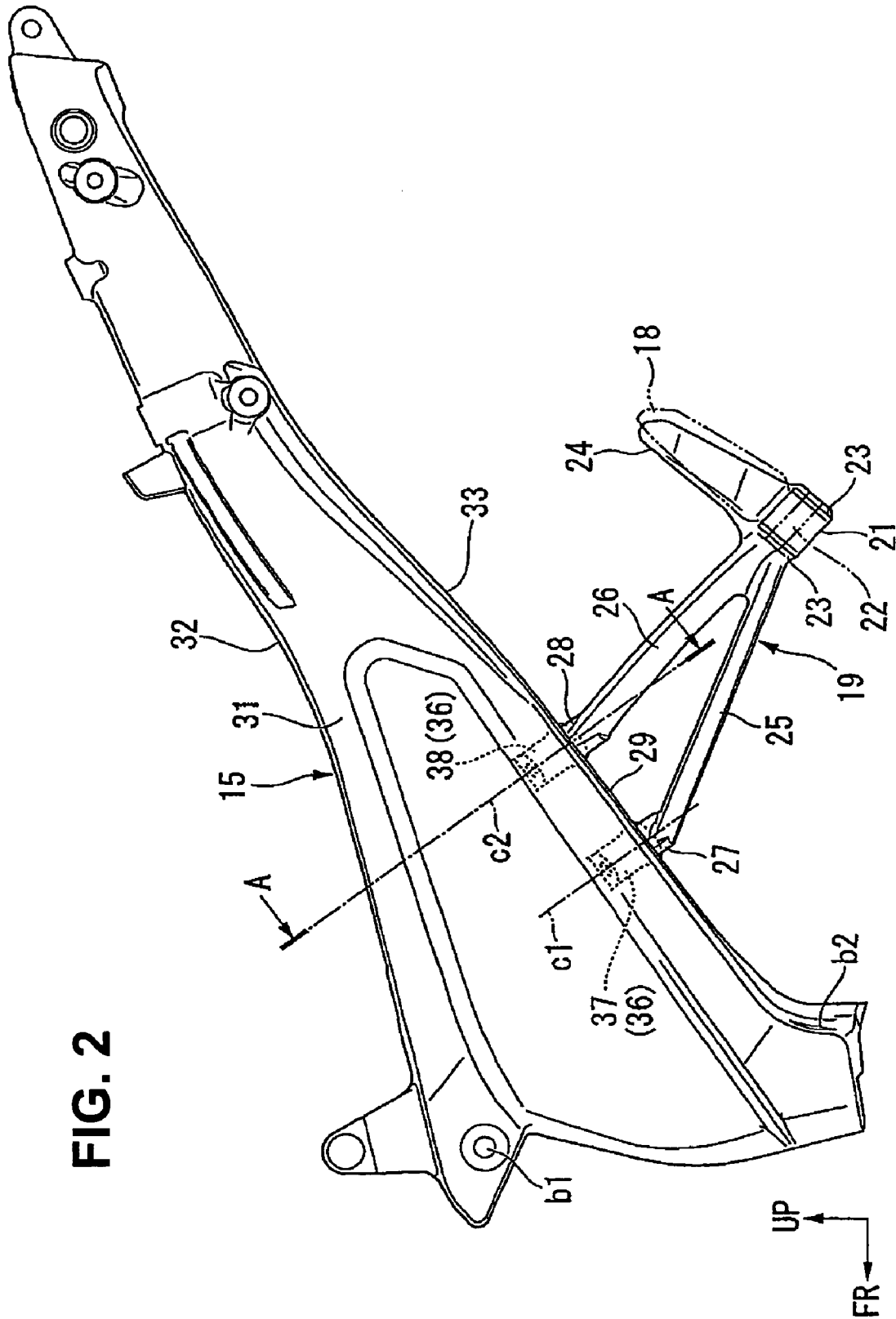
FIG. 2 is an enlarged left (outer) side elevational view of a rear frame on the left side of a body of the vehicle.

Referring also to FIG. 2, the left and right rear frames 15 are provided in such a manner as to extend rearwardly in a little rearwardly upwardly inclined state and in a tapering state from the opposite left and right sides of a rear end portion of the main frame section 10. The rear frames 15 are fastened at an upper side of a front end portion thereof to a rear end portion of the main frame section 10, for example, by a bolt extending in the leftward and rightward direction, and the lower side of the front end portion of the rear frames 15 is fastened to a rear end portion of the main frame section 10, for example, by a bolt extending in the forward and backward direction. It is to be noted that reference characters b1 and b2 in the figure denote upper and lower bolt fitting holes of a front end portion of the rear frames 15, respectively.

Referring to FIG. 1, the seat 13 has seat faces 13*a* and 13*b* for a driver and a rear portion passenger at front and rear portions thereof, respectively. Left and right steps 16 on which the feet of the driver are to be placed are attached to the rear side of a lower portion of the left and right pivot plates 8 individually through step brackets 17, and left and right pillion steps 18 on which the feet of a passenger on the rear portion of the seat are to be placed are attached to the lower side of a front portion of the rear frames 15 individually through stays 19.

Figure 4:
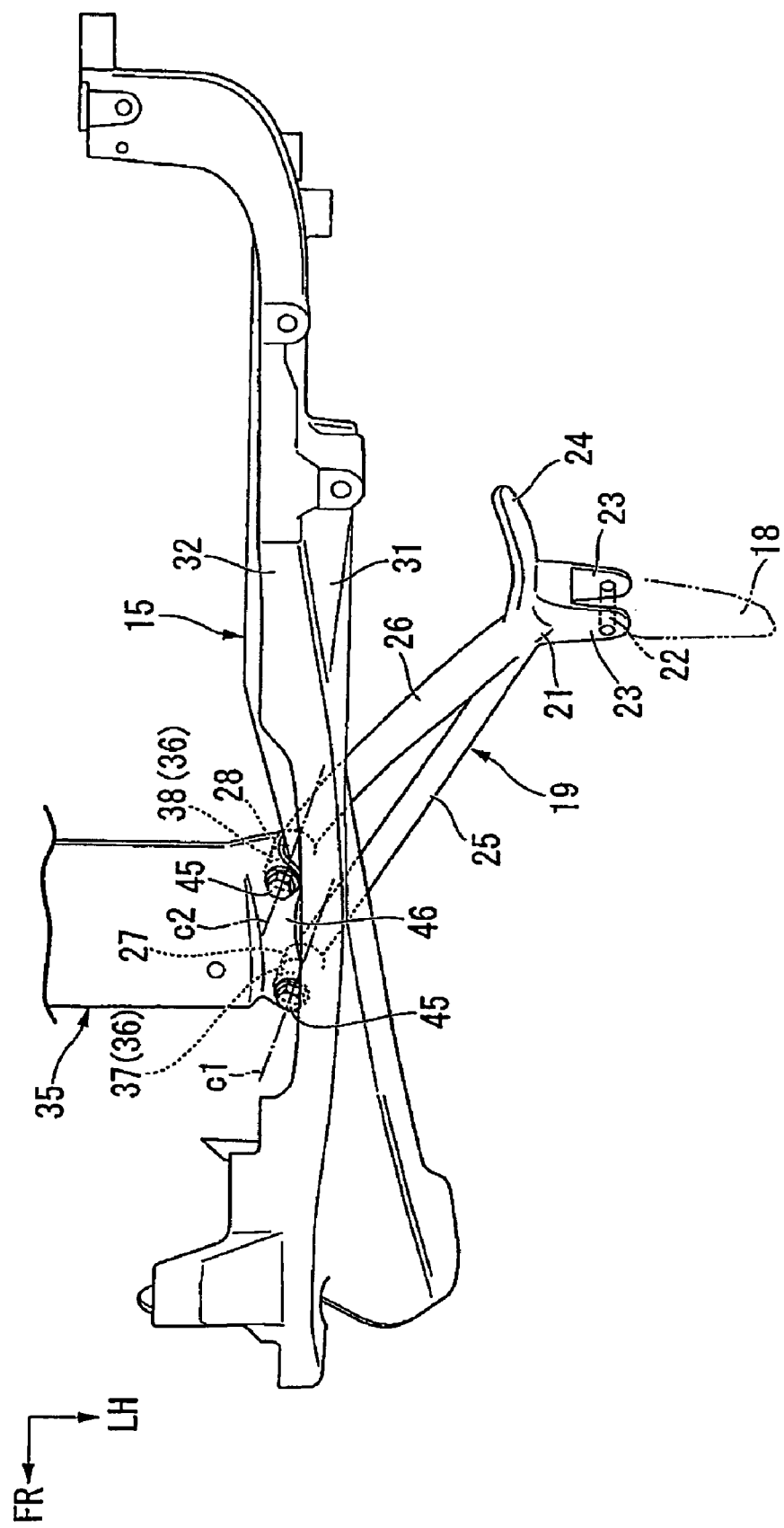
FIG. 4 is a top plan view of the rear frame.

Referring to FIGS. 2 and 4, the pillion step 18 is of the retractable type wherein it is selectively rockable between a use position (indicated by a chain line in FIG. 4) in which it projects substantially horizontally to the leftward or rightward outer side from a step supporting portion 21 provided at an end portion of the stay 19 and a retracted position (indicated by a chain line in FIG. 2) in which it is folded such that it extends obliquely rearwardly upwards from the step supporting portion 21. A forwardly upwardly inclined support shaft 22 extends through a base end portion of the pillion step 18, and the support shaft 22 is supported at the opposite end portions thereof by a pair of support walls 23 provided uprightly on the left and right outer sides of the step supporting portion 21. A heel plate 24 against which the inner side of a foot placed on the pillion step 18 can be pressed is provided on the obliquely rear upper side of the step supporting portion 21. It is to be noted that, although only the rear frame 15 and the pillion step 18 on the left side of the vehicle body are shown in the figures, those on the right side of the vehicle body are mirror-image symmetrical to those on the left side.

The stay 19 has the step supporting portion 21 and front and rear beam portions 25 and 26 branching and extending obliquely forwardly upwards as viewed in side elevation from the step supporting portion 21 in such a manner as to have a V shape as viewed in side elevation, and is a unitary cast part made of, for example, an aluminum alloy. At end portions (which also are base end portions of the stay 19) of the extensions of the front and rear beam portions 25 and 26 there are integrally formed cylindrical front and rear boss portions 27 and 28 having an inclination rather steeper, as viewed in side elevation, than that of the front and rear beam portions 25 and 26. The front and rear boss portions 27 and 28 are provided such that axial lines c1 and c2 thereof extend substantially perpendicularly to the lower face 29 on the lower side of the front portion of the rear frame 15 as viewed in side elevation. It is to be noted that the lower face 29 is a substantially flat face which is inclined rearwardly upwards and extends substantially in parallel to the leftward and rightward direction of the vehicle body. As viewed from above, the stay 19 is inclined also such that its lower side is positioned on the leftwardly (or rightwardly) outer side, and the left and right pillion step 18 is disposed on the leftwardly (or rightwardly) outer side with respect to the rear frames 15.

Figure 3:
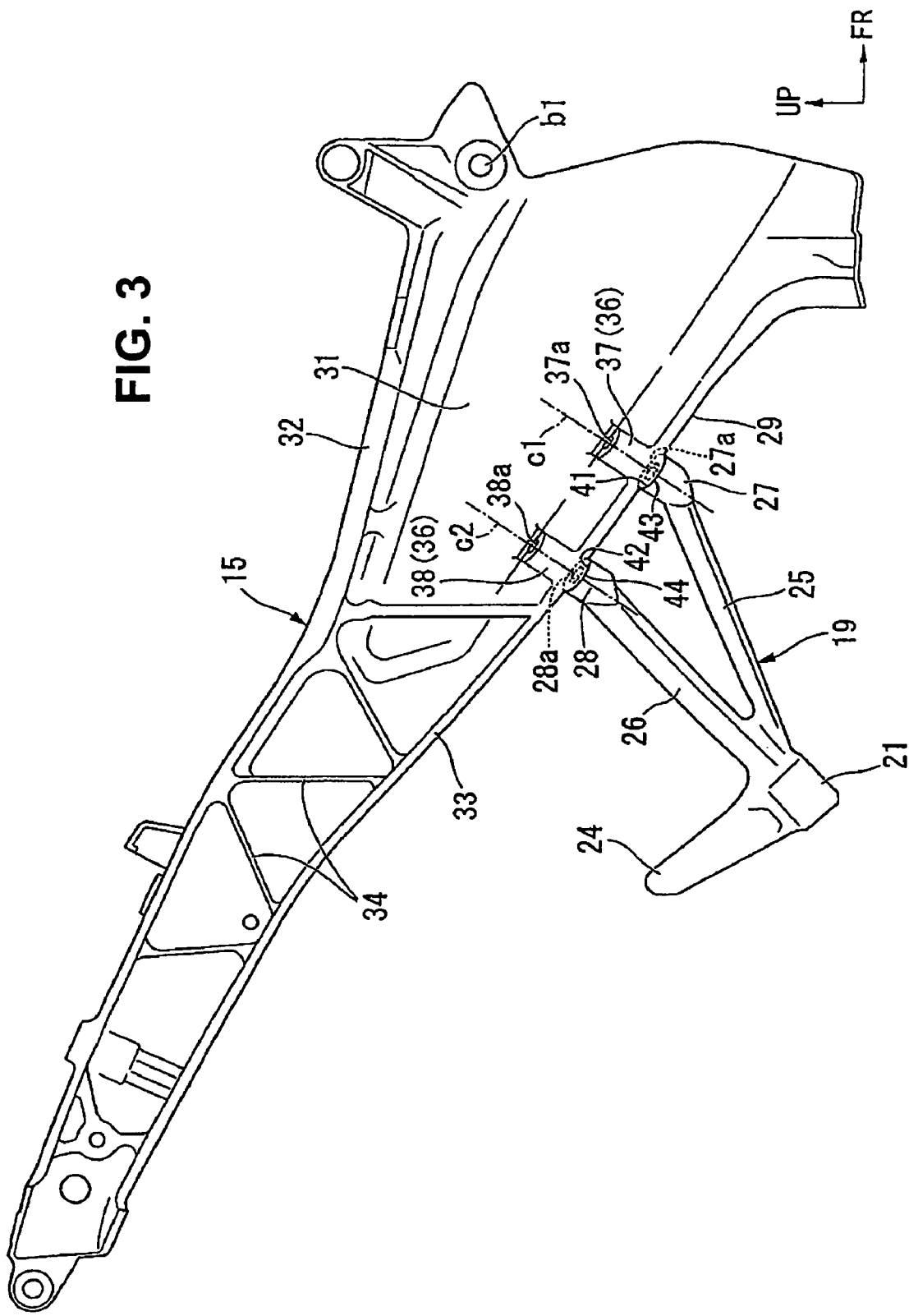
FIG. 3 is a right (inner) side elevational view of the rear frame.
Figure 5:
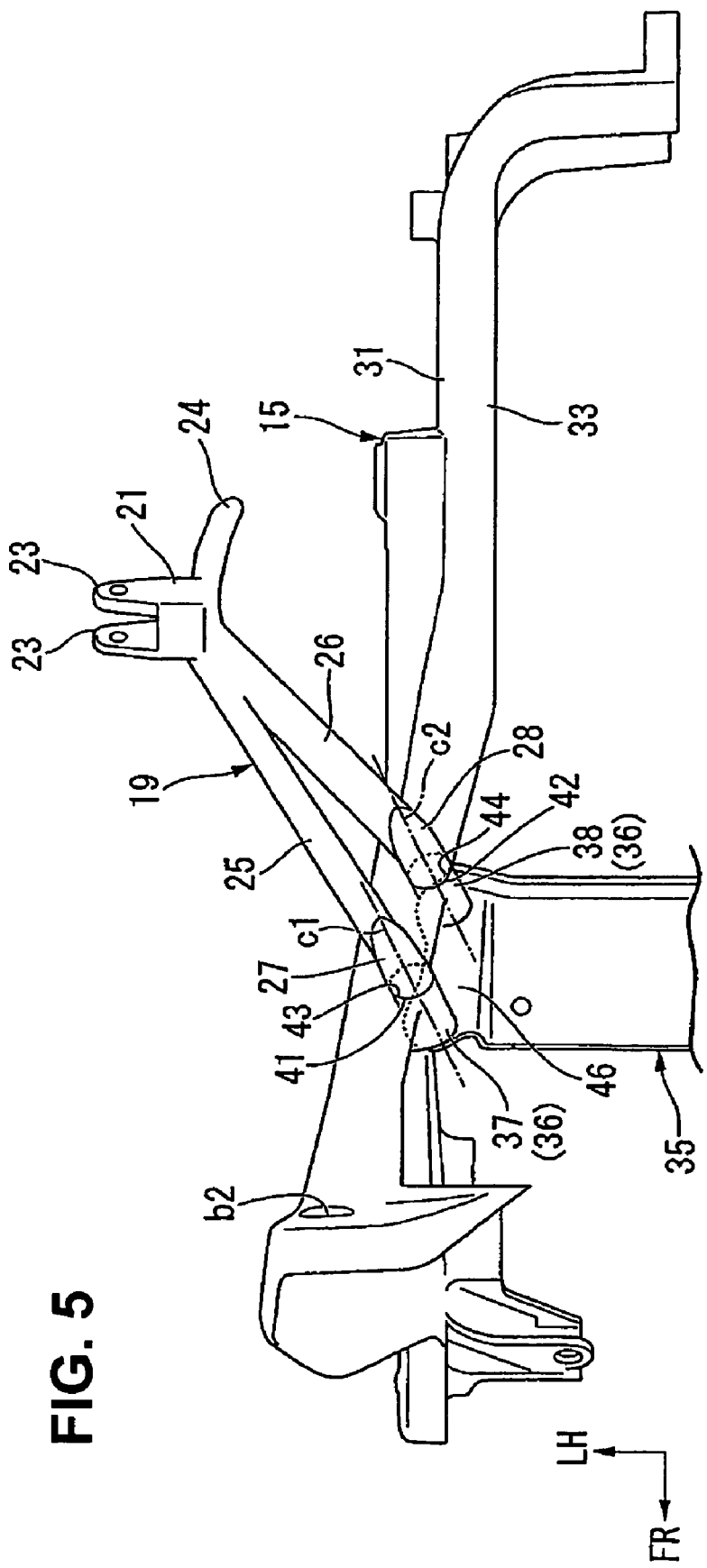
FIG. 5 is a bottom plan view of the rear frame.

Referring also to FIGS. 3 and 5, in the rear frame 15, a shape as viewed in side elevation wherein it extends obliquely upwardly rearwards in a tapering fashion is by an outer side wall 31 in the form of a plate extending substantially perpendicularly to the leftward and rightward direction and forming a body portion of the rear frame 15, and may be a unitary cast part made of, for example, an aluminum alloy. Upper and lower wall 32 and 33 portions extending uprightly along the leftward and rightward direction are formed integrally on the left and right inner sides at upper and lower edge portions of the outer side wall 31, respectively. Reinforcing ribs 34 in the form of a truss shape as viewed in side elevation are formed integrally on the left and right inner sides of a rear portion of the rear frames 15.

Here, the rear frames 15 are formed as left and right separate members at a rear portion of the vehicle body, and left and right rear end portions thereof are curved toward the left and right inner sides and connected to each other by a connecting member not shown while the lower sides of left and right front portions thereof are connected to each other by a cross member 35.

Further, stay-attaching portions 36 for attaching a base end portion (front and rear boss portions 27 and 28) of the stays 19 are formed integrally at locations of the lower side of each of the front portions of the rear frames 15 on the left and right inner sides with respect to the outer side wall 31.

Figure 6A:
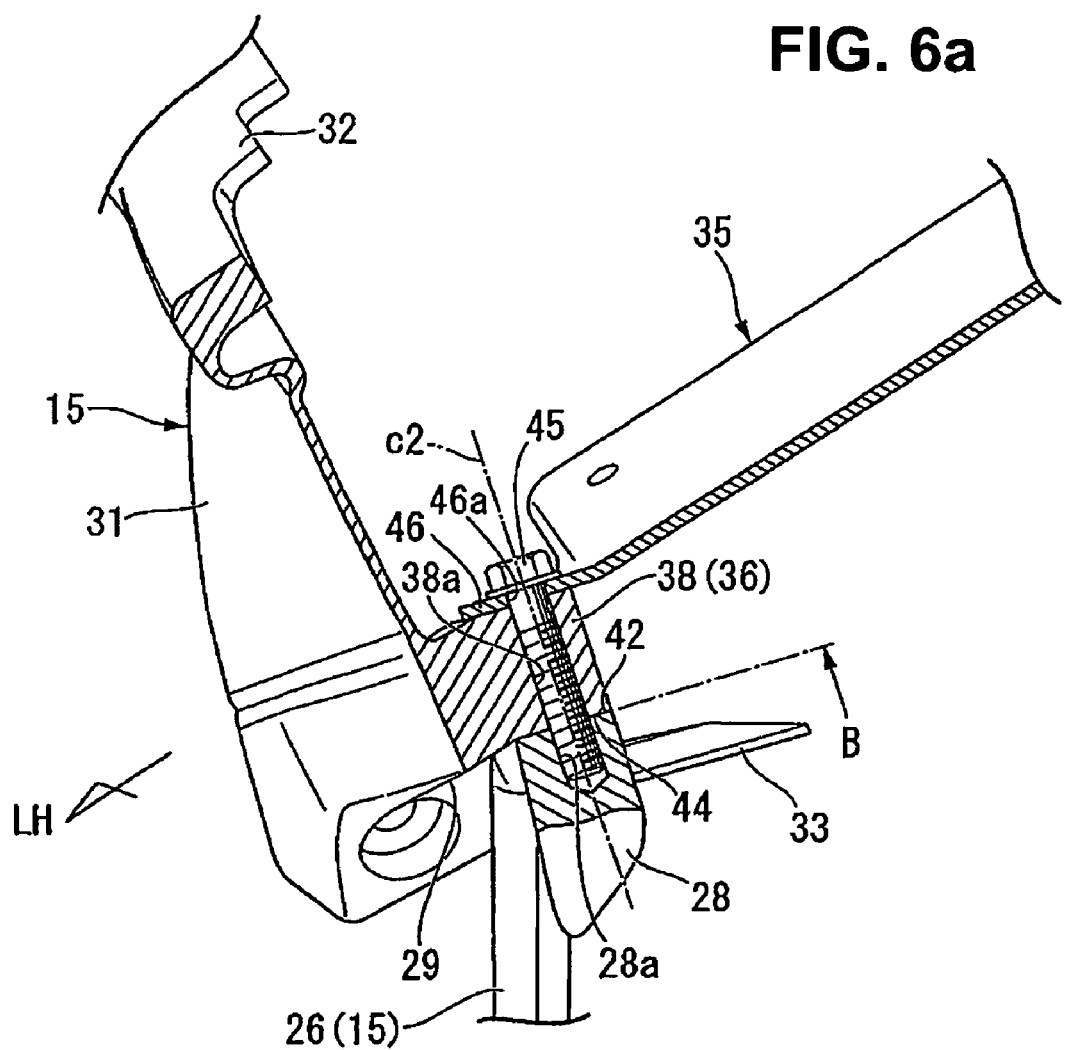
FIG. 6(*a*) is a sectional view taken along line A-A of FIG. 2.
Figure 6B:
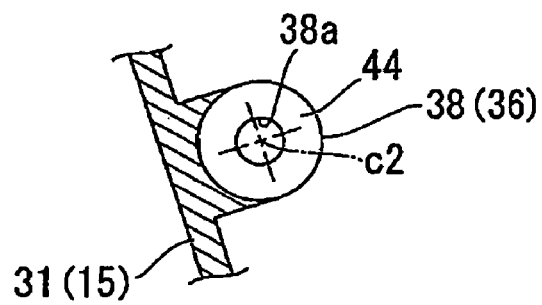

Referring also to FIGS. 6a and 6b, the stay attaching portion 36 has front and rear frame side boss portions 37 and 38 coaxial with the front and rear boss portions 27 and 28 on the left and right inner sides of the outer side walls 31. The front and rear frame side boss portions 37 and 38 project to the left and right inner sides from the inner faces of the outer side walls 31 and have semi-cylindrical end faces along the axial lines c1 and c2 on the tip side thereof while flattened circular upper and lower end faces perpendicular to the axial lines c1 and c2 are formed at upper and lower ends of the front and rear frame side boss portions 37 and 38. With lower end faces of the front and rear frame side boss portions 37 and 38, flattened circular upper and lower end faces similarly perpendicular to the axial lines c1 and c2 of the front and rear boss portions 27 and 28 of the stays 19 abut simultaneously from below. It is to be noted that, while, in the present embodiment, the lower end faces of the front and rear frame side boss portions 37 and 38 and the upper end faces of the front and rear boss portions 27 and 28 lie on the same plane, they may possibly lie on different planes. In the following, the upper end faces of the front and rear boss portions 27 and 28 are referred to as front and rear abutting faces 41 and 42 and the lower end faces of the front and rear frame side boss portions 37 and 38 are referred to as front and rear abutting faces 43 and 44, respectively.

Then, in a state wherein the front abutting faces 41 and 43 are abutted with each other and the rear abutting faces 42 and 44 are abutted with each other, lower, threaded portions of the fastening bolts 45 fitted from above in fitting holes 37a and 38a in the front and rear frame side boss portions 37 and 38 are screwed and tightened into threaded holes 27a and 28a on the inner sides of the front and rear boss portions 27 and 28 to fasten and fix the front and rear boss portions 27 and 28 integrally to the front and rear frame side boss portions 37 and 38 in the direction along the axial lines c1 and c2, whereby the pillion step 18 is supported on the step attaching portion of the rear frame 15 through the stay 19. It is to be noted that, while the fitting holes 37a and 38a are through-holes and the threaded holes 27a and 28a are bottomed holes, the threaded holes 27a and 28a may also be formed as through-holes. Or, another configuration wherein threaded holes are provided in the front and rear frame side boss portions 37 and 38 while insertion holes are provided in the front and rear boss portions 27 and 28 such that the fastening bolts 45 may be inserted from below may be adopted.

The abutting faces 41 to 44 are provided in a substantially flush relationship with the lower face 29 on the lower side of the front portion of the rear frame 15 thereby to suppress projection of lower portions of the front and rear frame side boss portions 37 and 38 from the lower face 29. It is to be noted that the axial lines c1 and c2 are inclined also as viewed from above such that the upper side thereof is positioned on the left and right inner sides, and consequently, also the front and rear frame side boss portions 37 and 38 and front and rear boss portions 27 and 28 as well as abutting faces 41 to 44 are inclined. Therefore, locations on the left and right inner sides of the front and rear abutting faces 43 and 44 of the front and rear frame side boss portions 37 and 38 are swollen a little from the lower face 29 as viewed in side elevation.

Referring to FIGS. 4, 5, 6a and 6b, the cross member 35 may be formed from a belt-shaped steel plate extending leftwardly and rightwardly, and coupling flanges 46 inclined forwardly downwards are formed at left and right end portions of the cross member 35. Upper end faces (bolt seat faces) of the front and rear frame side boss portions 37 and 38 lie on the same plane, and the lower face of the coupling flanges 46 contacts with the upper end faces of the front and rear frame side boss portions 37 and 38. Bolt fitting holes 46a are formed forwardly and backwardly of the coupling flange 46 (refer to FIG. 6), and by placing the coupling flange 46 between the upper face of the front and rear frame side boss portions 37 and 38 and the head portion of the fastening bolts 45 and tightening the fastening bolts 45, the coupling flange 46 can be fixed commonly to the front and rear frame side boss portions 37 and 38 together with the stay 19, whereby the left and right rear frames 15 are connected to each other through the cross member 35.

As described hereinabove, the rear portion structure of a vehicle body for a saddle-type vehicle according to the exemplary embodiment described above is applied to the motorcycle 1 which includes the pair of left and right rear frames 15 provided rearwardly of the main frame section 10 of the vehicle body and wherein the pillion steps 18 are attached to the left and right rear frames 15 individually through the stays 19, and the stay-attaching portions 36 (front and rear frame side boss portions 37 and 38) for attaching the base end portion (front and rear boss portions 27 and 28) of the stays 19 are provided in such a manner that the stay-attaching portions 36 project to the left and right inner sides of the left and right rear frames, and the base end portions of the stays 19 are fastened to the stay-attaching portions 36 in a substantially upward and downward direction substantially perpendicular to the leftward and rightward direction.

If this configuration is applied to a general vehicle body rear portion which includes the pair of left and right rear frames 15, it becomes possible to fasten the stays 19 of the pillion steps 18 in the direction substantially perpendicular to the leftward and rightward direction to the left and right inner sides of the left and right rear frames 15, and the conventional necessity to form holes for fastening the stays 19 in the rear frames 15 themselves is eliminated. Consequently, good rigidity of the rear frames 15 can be assured, and the exposure of the fastening bolts 45 and so forth to the leftwardly and rightwardly outer sides of the vehicle body is eliminated so that a good appearance of the vehicle body rear portion can be maintained.

Further, the rear portion structure of a vehicle body includes the cross member 35 extending between the left and right rear frames 15 and the left and right side portions of the cross member 35 are fastened to the stay-attaching portions 36 of the left and right rear frames 15 together with the stays 19 (fixed by common fastening). Consequently, it is possible to eliminate a mounting portion, fastening bolt and so forth for one of the connections, and simplification of the surroundings of the rear frames 15 and reduction of the number of parts is achieved. Further, by connecting the left and right stay-attaching portions 36 directly to each other by the cross member 35, good rigidity around the pillion steps 18 can be assured.

Further, according to the rear portion structure of a vehicle body, since the stay-attaching portions 36 (front and rear frame side boss portions 37 and 38) and the stays 19 (front and rear boss portions 27 and 28) form the abutting faces 41 to 44 which extend perpendicularly to the fastening directions and lie substantially in flush with the lower face 29 of the rear frames 15, assembly and manipulation of the abutting faces 41-44 of the stay-attaching portions 36 and the stays 19 is facilitated. Additionally, projection of the stay-attaching portions 36 from the lower face of the rear frames 15 can be suppressed to reduce the size of the rear frames 15 themselves.

Here, a modification to the exemplary embodiment described above is described with reference to FIGS. 7a and 7b. It is to be noted that, while FIGS. 7a and 7b show a configuration around a rear frame side boss portion 38 and a rear boss portion 28, this configuration can be applied also to a front frame side boss portion 37 and a front boss portion 27 side.

Figure 7A:
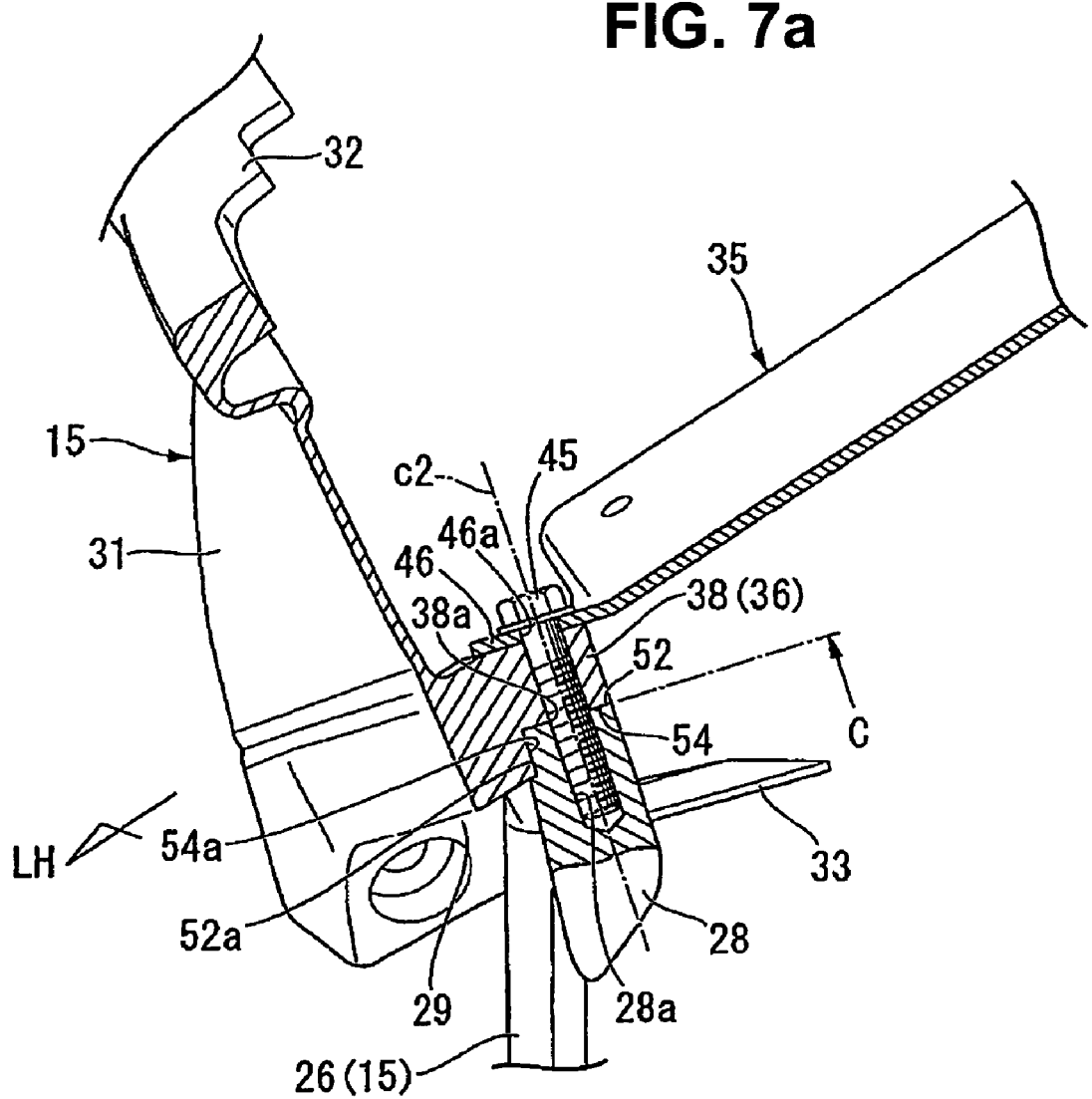
FIGS. 7(*a*), 7(*b*) show a modification to the exemplary embodiment, in which FIG. 7(*a*) is a sectional view corresponding to FIG. 6(*a*) and FIG. 7(*b*) is a sectional view taken along line C of FIG. 7(*a*).
Figure 7B:
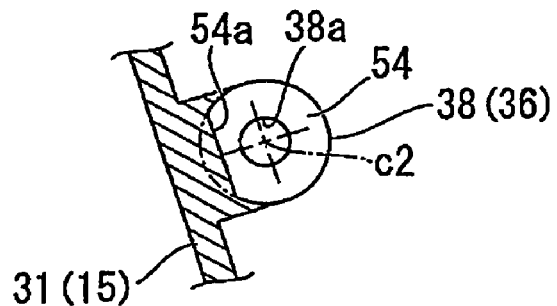

At a lower end portion of the rear frame side boss portion 38 shown in FIGS. 7a and 7b, an abutting face 54 formed by linearly cutting away, for example, part of the circular abutting face 44 adjacent the outer side wall 31 and displacing the part upwardly from the lower face 29 of the rear frame 15 and a flattened stepped face 54a which extends downwardly along the axial line c2 from the abutting face 54 adjacent the cutaway side and extending, for example, substantially perpendicularly to the leftward and rightward direction.

Meanwhile, at an upper end portion of the rear boss portion 28 shown in FIG. 7a, an abutting face 52 formed by cutting away part of the circular abutting face 42 similarly to the abutting face 54 and displacing the part upwardly from the lower face 29 and a stepped face 52a extending upwardly along the axial line c2 from the abutting face 52 adjacent the cutaway side and extending in parallel to and engagable with the stepped face 54a.

Then, by fitting the upper end portion of the rear boss portion 28 with the lower end portion of the rear frame side boss portion 38, the abutting faces 52 and 54 are abutted with each other and the stepped faces 52a and 54a are abutted with each other to effect and facilitate positioning of the rear boss portion 28 with respect to the rear frame side boss portion 38 along the direction (fastening direction) along the axial line c2 and in leftward and rightward direction. The front boss portion 27 is positioned with respect to the front frame side boss portion 37 similarly, thereby completing positioning of the stay 19 to the rear frame 15. Then, by fastening the front and rear frame side boss portions 37 and 38 and the front and rear boss portions 27 and 28 in this state, assembly of the pillion step 18 to the rear frame 15 is completed.

Where the abutting faces 52 and 54 extending perpendicularly to the fastening directions thereof and displaced upwardly from the lower face 29 of the rear frames 15 and the stepped faces 52a and 54a extending in parallel to the fastening directions and engagable with each other are formed on the stay attaching portion 36 and the stay 19 in this manner, projection of the stay attaching portion 36 from the lower face of the rear frame 15 is suppressed to suppress the size of the rear frame 15 itself. Further, since the stepped faces 52a and 54a are abutted with each other, positioning of the pillion step 18 upon assembly is facilitated and the coupling rigidity after the stay 19 is fastened can be raised.

It is to be noted that the present invention is not limited to the exemplary embodiment described above. For example, the fastening direction of the stay 19 to the rear frame 15 can be set suitably such that, for example, the stay 19 is fastened in a substantially forward and backward direction to the rear frame 15.

Further, if, in the modification described hereinabove, the direction of the stepped faces 52a and 54a is varied around the axial line c2, then positioning of the stay 19 can be carried out in an arbitrary direction perpendicular to the axial line c2, and besides, if a plurality of stepped faces having different directions are provided, then positioning of the stay 19 can be carried out more readily.

Further, the configuration in the exemplary embodiment described hereinabove is an example of the present invention, and naturally the present invention can be applied not only to a motorcycle but also to a three-wheeled or four-wheeled saddle-type vehicle or a scooter type vehicle having a low-floor foot receiving section and besides can be altered in various ways without departing from the subject matter of the present invention.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A rear portion structure of a vehicle body for a saddle-type vehicle comprising:
   a pair of left and right rear frames provided rearwardly of a main frame section of the vehicle body; and
   pillion steps attached to the left and right rear frames through respective stays, wherein each of said rear frames includes a stay attaching portion which projects on an inner side of the frame, and to which a corresponding one of said stays is fastened in a direction substantially perpendicular to the vehicle body's leftward and rightward direction.

2. The rear portion structure of a vehicle body for the saddle-type vehicle according to claim 1, further comprising a cross member extending between said left and right rear frames, and said cross member is commonly fastened at left and right side portions thereof to said stay-attaching portions of said left and right rear frames together with said stays.

3. The rear portion structure of a vehicle body for the saddle-type vehicle according to claim 1, wherein said stay-attaching portions and said stays include abutting faces which extend perpendicularly to the fastening directions of said stay-attaching portions and said stays and line in substantially flush with lower faces of said rear frames.

4. The rear portion structure of a vehicle body for the saddle-type vehicle according to claim 1, wherein said stay-attaching portions and said stays include abutting faces which extend perpendicularly to the fastening directions of said stay-attaching portions and said stays and are displaced upwardly from a lower face of said rear frames, and also include stepped faces which extend in parallel to the fastening directions and are engagable together.

5. The rear portion structure of a vehicle body for the saddle-type vehicle according to claim 1, wherein the stay-attaching portions project inwardly of the rear frames such that the stay-attaching portions are hidden from side view outwardly of the vehicle body by the rear frames.

6. The rear portion structure of a vehicle body for the saddle-type vehicle according to claim 1, further comprising fasteners which fasten the stays to the stay-attaching portions in the direction substantially perpendicular to the vehicle body's leftward and rightward direction, said fasteners being disposed inwardly of the rear frames such that the fasteners are hidden from side view outwardly of the vehicle body by the rear frames.

7. The rear portion structure of a vehicle body for the saddle-type vehicle according to claim 1, wherein each said stay includes an elongate beam portion and a boss portion formed at one end of the beam portion and through which the stay is attached to the stay-attaching portion of the rear frame, and wherein the boss portion extends at an angle to the beam portion such that an axis of the boss portion extends substantially perpendicular to a lower surface of the rear frame adjacent the stay-attaching portion.

8. The rear portion structure of a vehicle body for the saddle-type vehicle according to claim 7, wherein each of the stay-attaching portions includes a boss projecting inwardly of the inner side of the corresponding rear frame, an axis of the boss extends substantially perpendicular to the lower surface of the rear frame adjacent the stay-attaching portion, and the rear portion structure further includes a fastener which fastens the boss portion of the stay to the boss of the stay-attaching portion and extends along the axes thereof.

9. The rear portion structure of a vehicle body for the saddle-type vehicle according to claim 8, wherein said fastener is disposed inwardly of the rear frames such that the fastener is hidden from side view outwardly of the vehicle body by the rear frames.

10. The rear portion structure of a vehicle body for the saddle-type vehicle according to claim 1, wherein each said stay-attaching portion includes two bosses which are spaced from each other in a longitudinal direction of the vehicle body and project on the inner side of the associated rear frame, and each of said stays includes two elongate beam portions each having a boss portion formed at one end thereof and through which the stay is attached to the two bosses of the stay-attaching portion of the associated rear frame.

11. The rear portion structure of a vehicle body for the saddle-type vehicle according to claim 2, wherein said stay-attaching portions and said stays include abutting faces which extend perpendicularly to the fastening directions of said stay-attaching portions and said stays and line in substantially flush with lower faces of said rear frames.

12. The rear portion structure of a vehicle body for the saddle-type vehicle according to claim 2, wherein said stay-attaching portions and said stays include abutting faces which extend perpendicularly to the fastening directions of said stay-attaching portions and said stays and are displaced upwardly from a lower face of said rear frames, and also include stepped faces which extend in parallel to the fastening directions and are engagable together.

13. The rear portion structure of a vehicle body for the saddle-type vehicle according to claim 2, wherein the stay-attaching portions project inwardly of the rear frames such that the stay-attaching portions are hidden from side view outwardly of the vehicle body by the rear frames.

14. The rear portion structure of a vehicle body for the saddle-type vehicle according to claim 2, further comprising fasteners which fasten the stays to the stay-attaching portions in the direction substantially perpendicular to the vehicle body's leftward and rightward direction, said fasteners being disposed inwardly of the rear frames such that the fasteners are hidden from side view outwardly of the vehicle body by the rear frames.

15. The rear portion structure of a vehicle body for the saddle-type vehicle according to claim 2, wherein each said stay includes an elongate beam portion and a boss portion formed at one end of the beam portion and through which the stay is attached to the stay-attaching portion of the rear frame, and wherein the boss portion extends at an angle to the beam portion such that an axis of the boss portion extends substantially perpendicular to a lower surface of the rear frame adjacent the stay-attaching portion.

16. The rear portion structure of a vehicle body for the saddle-type vehicle according to claim 15, wherein each of the stay-attaching portions includes a boss projecting inwardly of the inner side of the corresponding rear frame, an axis of the boss extends substantially perpendicular to the lower surface of the rear frame adjacent the stay-attaching portion, and the rear portion structure further includes a fastener which fastens the boss portion of the stay to the boss of the stay-attaching portion and extends along the axes thereof.

17. The rear portion structure of a vehicle body for the saddle-type vehicle according to claim 16, wherein said fastener is disposed inwardly of the rear frames such that the fastener is hidden from side view outwardly of the vehicle body by the rear frames.

18. The rear portion structure of a vehicle body for the saddle-type vehicle according to claim 2, wherein each said stay-attaching portion includes two bosses which are spaced from each other in a longitudinal direction of the vehicle body and project on the inner side of the associated rear frame, and each of said stays includes two elongate beam portions each having a boss portion formed at one end thereof and through which the stay is attached to the two bosses of the stay-attaching portion of the associated rear frame.

* * * * *